(12) United States Patent
Vos et al.

(10) Patent No.: US 9,681,506 B2
(45) Date of Patent: Jun. 13, 2017

(54) SWITCH CIRCUIT FOR LED LIGHTING ASSEMBLY ADAPTIVE TO MULTILEVEL LIGHT SWITCHES

(71) Applicant: 3M INNOVATIVE PROPERTIES COMPANY, St. Paul, MN (US)

(72) Inventors: Martin J. Vos, St. Paul, MN (US); Gregory G. Jager, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 68 days.

(21) Appl. No.: 14/442,479

(22) PCT Filed: Dec. 2, 2013

(86) PCT No.: PCT/US2013/072583
§ 371 (c)(1),
(2) Date: May 13, 2015

(87) PCT Pub. No.: WO2014/093044
PCT Pub. Date: Jun. 19, 2014

(65) Prior Publication Data
US 2016/0286612 A1 Sep. 29, 2016

Related U.S. Application Data

(60) Provisional application No. 61/735,179, filed on Dec. 10, 2012.

(51) Int. Cl.
*H05B 37/00* (2006.01)
*H05B 33/08* (2006.01)
*H05B 37/02* (2006.01)

(52) U.S. Cl.
CPC ....... *H05B 33/0815* (2013.01); *H05B 33/083* (2013.01); *H05B 33/0827* (2013.01);
(Continued)

(58) Field of Classification Search
CPC ............ H05B 33/0815; H05B 33/0827; H05B 33/083; H05B 33/0842; H05B 33/0845; H05B 37/02
See application file for complete search history.

(56) References Cited

U.S. PATENT DOCUMENTS 6,636,003 B2  10/2003  Rahm
7,038,399 B2  5/2006  Lys
(Continued)

FOREIGN PATENT DOCUMENTS

CN      201657405      11/2010
WO   WO 2010-137921   12/2010

OTHER PUBLICATIONS

International Search Report for PCT International Application No. PCT/US2013/072583, mailed on Apr. 15, 2014, 3pgs.

*Primary Examiner* — Tung X Le
*Assistant Examiner* — Raymond R Chai
(74) *Attorney, Agent, or Firm* — X. Christina Huang

(57) ABSTRACT

One aspect of the present disclosure directs to a switch circuit including an isolator circuit to allow detection of switch states of a multilevel light switch. Another aspect of the present disclosure directs to a lighting assembly containing light emitting diodes (LEDs) of different colors, where the lighting assembly produces light of different color depending on the switch state of a multilevel light switch.

13 Claims, 6 Drawing Sheets

(52) U.S. Cl.
CPC ..... *H05B 33/0842* (2013.01); *H05B 33/0845* (2013.01); *H05B 37/02* (2013.01); *Y02B 20/346* (2013.01)

(56) References Cited

U.S. PATENT DOCUMENTS

| | | |
|---|---|---|
| 7,748,877 B1 | 7/2010 | Colby |
| 8,198,819 B2 | 6/2012 | Lenk |
| 2010/0164408 A1* | 7/2010 | Kuo ................... H05B 37/0227 315/307 |
| 2010/0308738 A1 | 12/2010 | Shteynberg |
| 2011/0204777 A1 | 8/2011 | Lenk |
| 2012/0176046 A1* | 7/2012 | Tsai ................... H05B 33/0851 315/185 R |
| 2012/0194078 A1 | 8/2012 | Ren |
| 2013/0119887 A1* | 5/2013 | Clark ................ H05B 33/0812 315/291 |

\* cited by examiner

SWITCH CIRCUIT FOR LED LIGHTING ASSEMBLY ADAPTIVE TO MULTILEVEL LIGHT SWITCHES

BACKGROUND

A multilevel light switch, such as a three-way socket switch, typically includes two or more circuit switches with a combination of switch states (i.e., low—medium—high—off, etc.), where each switch state is corresponding to a power source or power source level to be provided to a lighting assembly coupled to the multilevel light switch. A multilevel light switch often allows the lighting assembly to be connected to more than two electrical contacts that provide more than one power source to the lighting assembly, where the connection is determined by the switch state. Three-way socket switches, for example, include two circuit switches and allow connections to part or all of three electrical contacts—center contact, ring contact, and neutral contact.

Light Emitting Diodes (LEDs) become more widely used in commercial and residential lighting because of their durability and high energy efficiency. An LED lighting assembly, also referred to as an LED lamp or an LED light bulb, usually contains one or more LED junctions and an LED driver. Some LED lighting assemblies can screw into a standard E26 Edison socket and easily replace fluorescent and incandescent light bulbs.

SUMMARY

At least one aspect of the present disclosure features an LED switch circuit designed to connect to an LED driver and a multilevel light switch having a first switch and a second switch, comprising a first isolator circuit, a second isolator circuit, and a converter circuit. The first isolator circuit is coupled to the first switch and configured to detect a first switch state of the first switch and produce a first signal associated with the first switch state. The second isolator circuit is coupled to the second switch and configured to detect a second switch state of the second switch and produce a second signal associated with the second switch state. The converter circuit is coupled to a dimming input port of the LED driver and configured to receive the first signal and the second signal and generate a dimming signal associated with the first signal and the second signal. The dimming input port of the LED driver receives the dimming signal from the converter circuit and the LED driver is configured to control an LED based upon the dimming signal.

At least one aspect of the present disclosure features an LED lighting assembly designed to connect to a multilevel light switch having a first switch and a second switch, comprising a first LED, a second LED, and an LED switch circuit. The LED switch circuit includes a first isolator circuit, a second isolator circuit, a first converter circuit, and a second converter circuit. The first isolator circuit is coupled to the first switch and configured to detect a first switch state and produce a first signal associated with the first switch state. The second isolator circuit is coupled to the second switch and configured to detect a second switch state and produce a second signal associated with the second switch state. The first converter circuit is coupled to the first LED and configured to receive the first signal and change current flowing through the first LED in response to the first signal. The second converter circuit is coupled to the second LED and configured to receive the second signal and change current flowing through the second LED in response to the second signal.

At least one aspect of the present disclosure features an LED lighting assembly designed to connect to a multilevel light switch having a first switch and a second switch, comprising a first LED, a second LED, and an LED switch circuit. The LED switch circuit includes a first isolator circuit, a second isolator circuit, a logic circuit, a first converter circuit, and a second converter circuit. The first isolator circuit is coupled to the first switch and configured to detect a first switch state and produce a first signal associated with the first switch state. The second isolator circuit is coupled to the second switch and configured to detect a second switch state and produce a second signal associated with the second switch state. The logic circuit is coupled to the first isolator circuit and the second isolator circuit and configured to receive the first signal and the second signal and generate a first logic signal and a second logic signal based on the first signal and the second signal. The first converter circuit is coupled to the logic circuit and the first LED and configured to receive the first logic signal and change current flowing through the first LED in response to the first logic signal. The second converter circuit is coupled to the logic circuit and the second LED and configured to receive the second logic signal and change current flowing through the second LED in response to the second logic signal.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

It is desirable to have an LED lighting assembly that can be electrically coupled to a multilevel light switch so the level of illumination intensity can be controlled by the switch. In some cases, it is desirable to have an LED lighting assembly that can screw into a standard three-way socket (i.e., Edison E26d socket), which can provide three levels (i.e., low-medium-high) of illumination intensity based on the socket switch state. One way to design such an LED lighting assembly is to duplicate the LED driver and LED(s) for each filament load in an incandescent bulb. However, such configuration leads to an excessive number of components that can be difficult to fit into conventional light bulb housing and relative high cost of the lighting assembly. At least one aspect of the present disclosure directs to a switch circuit designed to interpret the switch state of a multilevel light switch, where the switch circuit can be coupled to one LED driver to drive LED(s) to produce different illumination intensity levels in response to the state changes of the multilevel light switch. In such implementations, only one LED driver is necessary, so fewer components are required and lower cost is possible. In some embodiments, the switch circuit includes an isolator circuit to generate a signal corresponding to the state of the multilevel light switch. In a particular embodiment for interpreting the state of the multilevel light switch, one or more opto-isolators are used in the switch circuit.

In some embodiments, a multilevel light switch includes two or more circuit switches and the switch circuit is designed to use two or more isolator circuits, where the isolator circuits are electrically coupled to the two or more circuit switches on a one-to-one basis, to detect the state of each of the two or more circuit switches independently. At least one aspect of the present disclosure directs to embodiments of an LED switch circuit electrically coupled to one or more LED(s) and an LED driver, where the LED switch circuit is configured to activate one or more LED(s) depending on the state of a multilevel light switch. In some cases, the one or more LED(s) may have different colors such that the activated LED(s) collectively can produce lights of various colors depending on the switch state. In some implementations, the LED switch circuit includes two or more isolator circuits to detect the state of two or more circuit switches in the multilevel light switch independently.

Figure 1:
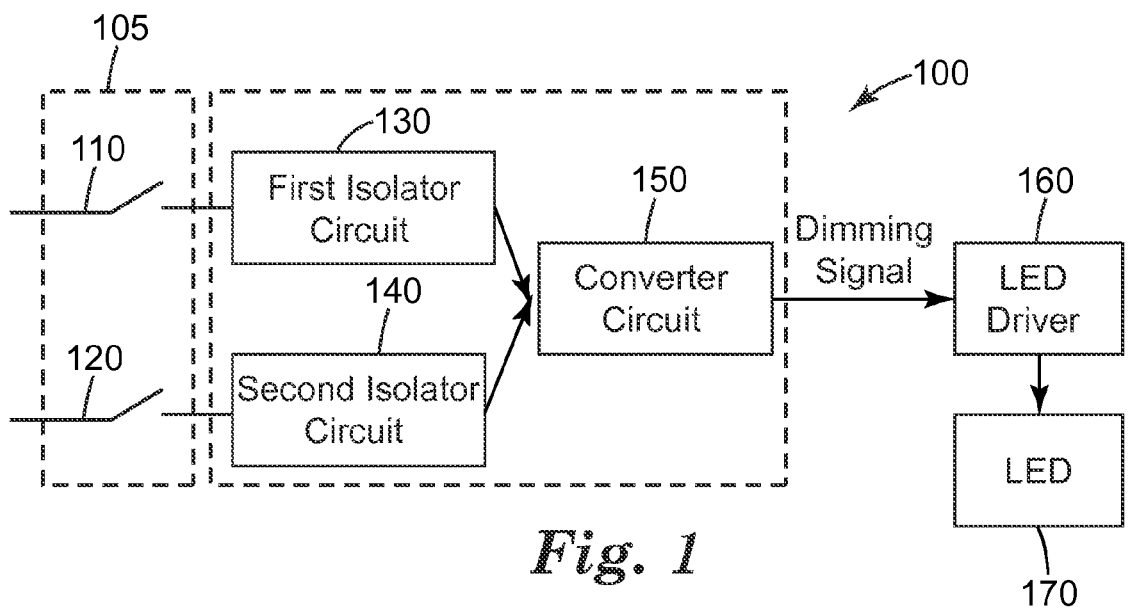
FIG. 1 illustrates a block diagram of an exemplary embodiment of an LED switch circuit.

FIG. 1 illustrates a block diagram of an exemplary embodiment of an LED switch circuit 100 that is in connection with a multilevel light switch 105 and an LED driver 160. In some embodiments, the multilevel light switch 105 includes a first switch 110 and a second switch 120. In some cases, the LED switch circuit 100 includes a first isolator circuit 130, a second isolator circuit 140, and a converter circuit 150. The LED driver 160 includes a dimming input port. The LED driver 160 supplies and controls current flowing through an LED 170. In some cases, the illumination intensity of the LED 170 can be changed in response to the magnitude of the current supplied by the LED driver 160. In such cases, the LED driver 160 can adjust the current output based on the dimming signal received from the dimming input port. The first isolator circuit 130 is coupled to the first switch 110. The first isolator circuit 130 is configured to detect the state of the first switch 110, also referred to as a first switch state, and produce a first signal associated with the first switch state. The second isolator circuit 140 is coupled to the second switch. The second isolator circuit 140 is configured to detect the state of the second switch 120, also referred to as a second switch state, and produce a second signal associated with the second switch state.

In some embodiments, the converter circuit 150 is configured to receive the first signal and the second signal and generate a dimming signal associated with the first signal and the second signal. The converter circuit 150 is coupled to the dimming input port of the LED driver 160 and further configured to send the dimming signal to the dimming input port of the LED driver 160. The LED driver 160 can provide power to one or more LED(s). Components of the LED switch circuit 100, the LED driver 160, and the LED 170 can be implemented within a single housing or among several housings. For example, the LED switch circuit 100, the LED driver 160, and the LED 170 are implemented within one light bulb envelope designed to fit into a conventional light bulb socket. As another example, the LED driver 160 and the LED 170 can be placed in a separate housing from the LED switch circuit 100.

An LED, also referred to as an 'LED device', comprises one or more LED junctions, where each LED junction can be implemented with any type of LED of any color emission but with preferably the same current rating. In some embodiments, the LED junctions are connected in series. Multiple LED junctions can be contained in a single LED housing or among several LED housings. For example, an LED device may comprise six LED junctions within one LED housing. The LED driver 160 can provide current for activating one or more LEDs to provide illumination. The LED driver 160 can be implemented by Integrated Circuit (IC) chips, circuits including analog and/or digital electronic components, or a combination thereof. Accordingly, the dimming input port of the LED driver 160 can be one or more pins of an IC chip, one or more connection wires of a circuit, or a combination thereof. In some cases, the LED driver 160 typically has a dimming input port that accepts a dimming signal and adjusts the output power source level supplied to LED(s) in response to the dimming signal. The dimming signal can be, for example, a voltage input. In some embodiments, the LED driver 160 controls current flowing through the LED 170 in response to the dimming signal. In some cases, the LED driver 160 can generate a particular level of output current to LED(s) based on the voltage input as the dimming signal in comparison with a predetermined voltage level.

The first isolator circuit 130 and/or the second isolator circuit 140 can include a circuit designed to provide electrical isolation between input and output so that the state of the circuit switches can be detected independently. For example, the state of the first switch 110 will have minimum or no impact on the output signal from the second isolator circuit 140. The isolator circuit can include IC chips, circuits including analog and/or digital components and/or sensing components, and a combination thereof. For example, the isolator circuit can include opto-isolator(s), inductive transformer(s), digital isolator(s), or the like. In an exemplary embodiment, the first isolator circuit 130 and/or the second isolator circuit 140 can include one or more opto-isolators, also referred to as optocouplers, which can convert an electrical input signal into light, detect the converted light, and then generate electric energy or modulate current flowing from a power source. In some cases, the first isolator circuit 130 and/or the second isolator circuit 140 can include a bridge circuit designed to prevent current back flow from one isolator circuit to the other isolator circuit.

In some embodiments, the first isolator circuit 130 can detect the state of the first switch 110 and generate a first signal corresponding to the first switch state. The second isolator circuit 140 can detect the state of the second switch 120 and generate a second signal corresponding to the second switch state. In some cases, the converter circuit 150 can accept the first signal generated by the first isolator circuit 130 and the second signal generated by the second isolator circuit 140 and generate a dimming signal in response to the first signal and the second signal. In some embodiments, the converter circuit 150 can include a transistor. In some implementations, the converter circuit 150 can include a field-effect transistor (FET). In some cases, the converter circuit 150 can include a metal-oxide-semiconductor field-effect transistor (MOSFET). The dimming signal is further provided to the LED driver 160 to regulate power (i.e., voltage, current, etc.) supplied to LED(s).

In some implementations, a multilevel light switch can include more than two circuit switches. In such implementations, the LED switch circuit can include isolator circuits to interpret the states of the circuit switches independently and generate a dimming signal corresponding to the states of the circuit switches.

Figure 2:
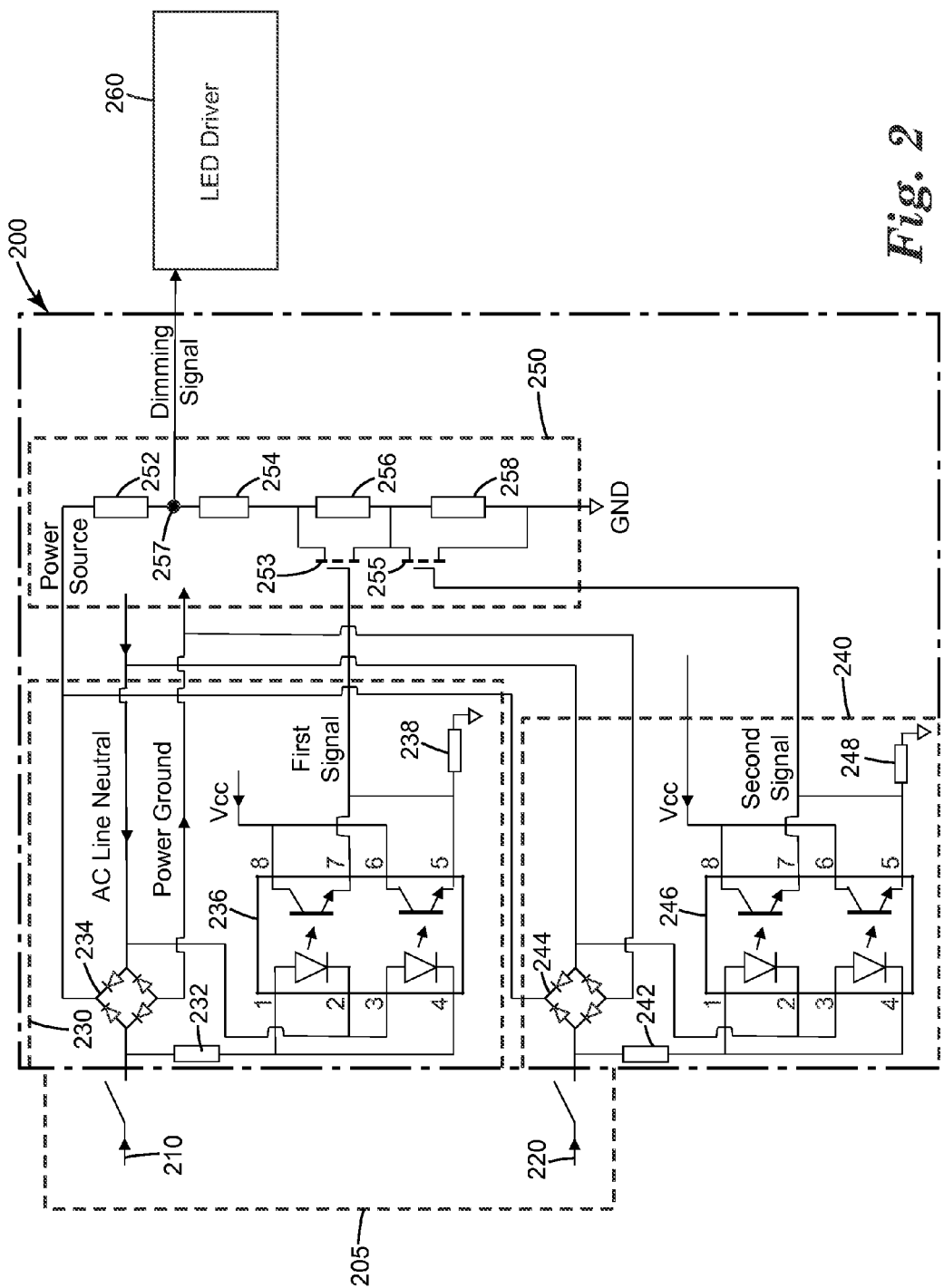
FIG. 2 illustrates a schematic diagram of an exemplary embodiment of an LED switch circuit in connection with a multilevel light switch and an LED driver.

FIG. 2 illustrates a schematic diagram of an exemplary embodiment of an LED switch circuit 200 in connection with a multilevel light switch 205 and an LED driver 260. In some embodiments, the LED switch circuit 200 includes a first isolator circuit 230, a second isolator circuit 240, and a converter circuit 250. The multilevel light switch 205 includes a first switch 210 and a second switch 220. In some implementations, the multilevel light switch 205 is a three-way socket switch where the first switch 210 is connected to the AC line hot ring contact and the second switch 220 is connected to the AC line hot center contact. The first isolator circuit 230 is electrically coupled to the first switch 210. The second isolator circuit 240 is electrically coupled to the second switch 220.

In some embodiments as illustrated in FIG. 2, the first isolator circuit 230 includes a resistor 232, an opto-isolator device 236, a rectifier 234, and a resistor 238. In some implementations, the opto-isolator device 236 can include two optocouplers where each opto-coupler is designed to accept current of one polarity (i.e., one optocoupler accepting positive polarity current and the other optocoupler accepting negative polarity current). The opto-isolator device 236 is an IC chip, for example, TLP523-2, available from Toshiba Corporation, Tokyo, Japan. The resistor 232 is connected between the first switch 210 and the input pins (i.e., pin 1 and pin 4) of the opto-isolator device 236, where the other two input pins of the opto-isolator device 236 are connected with AC line neutral. The rectifier 234 can include a diode bridge circuit (as illustrated in FIG. 2) or other rectifier circuit. The rectifier circuit can provide the functionality of independent detection of the states of the two switches 210 and 220. In some implementations, for example, when the first switch 210 is on and the second switch 220 is off, the rectifier 244 can prevent the current "leaking" from the first isolator circuit 230 into the second isolator circuit 240. A switch being on refers to the switch allowing current to flow. A switch being off refers to the switch's input and output being disconnected and with current flow blocked. In some cases, the rectifier 244 also provides rectified power to the LED driver 260. The resistor 238 is connected to the output pins (i.e., pin 5 and pin 7) of the opto-isolator device 236. The first isolator circuit 230 generates a first signal at the output pins (i.e., pin 5 and pin 7) of the opto-isolator device 236 that feeds into the converter circuit 250.

Similarly, in some embodiments, the second isolator circuit 240 includes a resistor 242, an opto-isolator device 246, a rectifier 244, and a resistor 248, with a similar circuit design as the first isolator circuit 230. The second isolator circuit 240 generates a second signal at the output pins (i.e., pin 5 and pin 7) of the opto-isolator device 246 that feeds into the converter circuit 250.

In some embodiments, the converter circuit 250 can include a MOSFET to influence a dimming signal in response to the first signal and the second signal. In a particular implementation, the converter circuit 250 includes two MOSFETs 253 and 255, four resistive elements 252, 254, 256, and 258. In one embodiment, the first signal and the second signal drive the MOSFET 253 and MOSFET 255 individually with the two bypassing resistive elements 256 and 258 and influence a dimming signal at point 257.

The dimming signal generated by the LED switch circuit 200 is provided to the dimming input port of the LED driver 260. The LED driver 260 can produce various levels of current supplied to LED(s) in response to the dimming signal and thereby adjust the illumination intensity of LED(s). The resistance value of the resistive elements (i.e., the resistive element 252 and/or 254, etc.) can be selected to adjust the magnitude of dimming signal generated by the converter circuit 250, and thereby change the illumination intensity of LED(s). The converter circuit in FIG. 2 is an example of a variable resistor network that provides an attenuated replica of the rectified line voltage to the LED driver 260. In some cases, this replica tracking the line voltage can be used by 260 to generate a proportional line current. This scenario is given here as one example that leads to outstanding power factor performance.

Table 1 illustrates the combined four states of a multilevel light switch having two circuit switches and corresponding illumination intensity levels generated by LED(s) using an LED switch circuit as illustrated in FIG. 2. The effective resistor combination at point 257, where the dimming signal is provided from the converter circuit 250 to the LED driver 260 in the circuit design in the above example, is also listed in Table 1. The LED(s) are off when both the first switch 210 and the second switch 220 are off. When the first switch 210 is on and the second switch 220 is off, the resistive element 256 is bypassed and a first amplitude level of dimming signal is produced. The LED driver 260 receives the dimming signal and supplies a high level of current to the LEDs to produce high illumination intensity. When the first switch 210 is off and the second switch 220 is on, the resistive element 258 is bypassed and a second level of dimming signal is produced. The LED driver 260 receives the dimming signal and supplies a medium level of current to the LEDs to produce medium illumination intensity. When the first switch 210 and the second switch 220 are on, the resistive element 256 and the resistive element 258 are bypassed and a third level of dimming signal is produced. The LED driver 260 receives the dimming signal and supplies a low level of current to the LED(s) to produce low illumination intensity.

Note that the order of illumination intensity and switch states in Table 1 is different from an incandescent 3-way light bulb with two filaments. However, the order of illumination intensity can be changed by varying the circuit design and selection of MOSFETs and bypassed resistors.

TABLE 1

| First Switch | Second Switch | Effective Resistors between 257 and GND | Illumination Intensity |
|---|---|---|---|
| off | off | 254 + 256 + 258 | off |
| on | off | 254 + 258 | high |
| off | on | 254 + 256 | medium |
| on | on | 254 | low |

In some embodiments, the dimming signal has four amplitude levels corresponding to the four combined states of a multilevel light switch having a first switch and the second switch, and the LED driver is configured to generate four current levels to supply to an LED in response to various amplitude levels of the dimming signal. In some cases, the dimming signal is at a first amplitude level when the first switch state is off and the second switch state is off, and the LED driver is configured in response to the dimming signal to supply a first level current to an LED (although this is a trivial case in Table 1); the dimming signal is at a second amplitude level when the first switch state is on and the second switch state is off, and the LED driver is configured in response to the dimming signal to supply a second level current to an LED; the dimming signal is at a third amplitude level when the first switch state is off and the second switch state is on, and the LED driver is configured in response to the dimming signal to supply a third level current to an LED; the dimming signal is at a fourth amplitude level when the first switch state is on and the second switch state is on, and the LED driver is configured in response to the dimming signal to supply a fourth level current to an LED. In some cases, a lowest level current can be no current.

At least one aspect of the present disclosure directs to embodiments of an LED lighting assembly that can activate one or more LED(s) using a switch circuit in response to the state of a multilevel light switch. In some embodiments, when the multilevel light switch is at a first state, the LED lighting assembly can activate a first LED; when the multilevel light switch is at a second state, the LED lighting assembly can activate a second LED; when the multilevel light switch is at a third state, the LED lighting assembly can activate both the first LED and the second LED. In some implementations, the first LED and the second LED can produce lights at different intensity levels (i.e., the second LED is brighter than the first LED); and then the LED lighting assembly, including an LED switch circuit, an LED driver, and LED(s) (i.e., the first LED and the second LED) can produce multi-level illumination intensity in response to the state of a multilevel light switch electrically coupled to the LED switch circuit.

LED light sources have a unique capability to produce spectral output or color variations, whose ranges of variation exceed the possible range obtainable by incandescent or fluorescent lamps. At least one aspect of the present disclosure directs to embodiments of an LED lighting assembly having two or more color LEDs that can produce lights of various illumination spectrums in response to the state of a multilevel light switch using an LED switch circuit coupled to the light switch.

Figure 3:
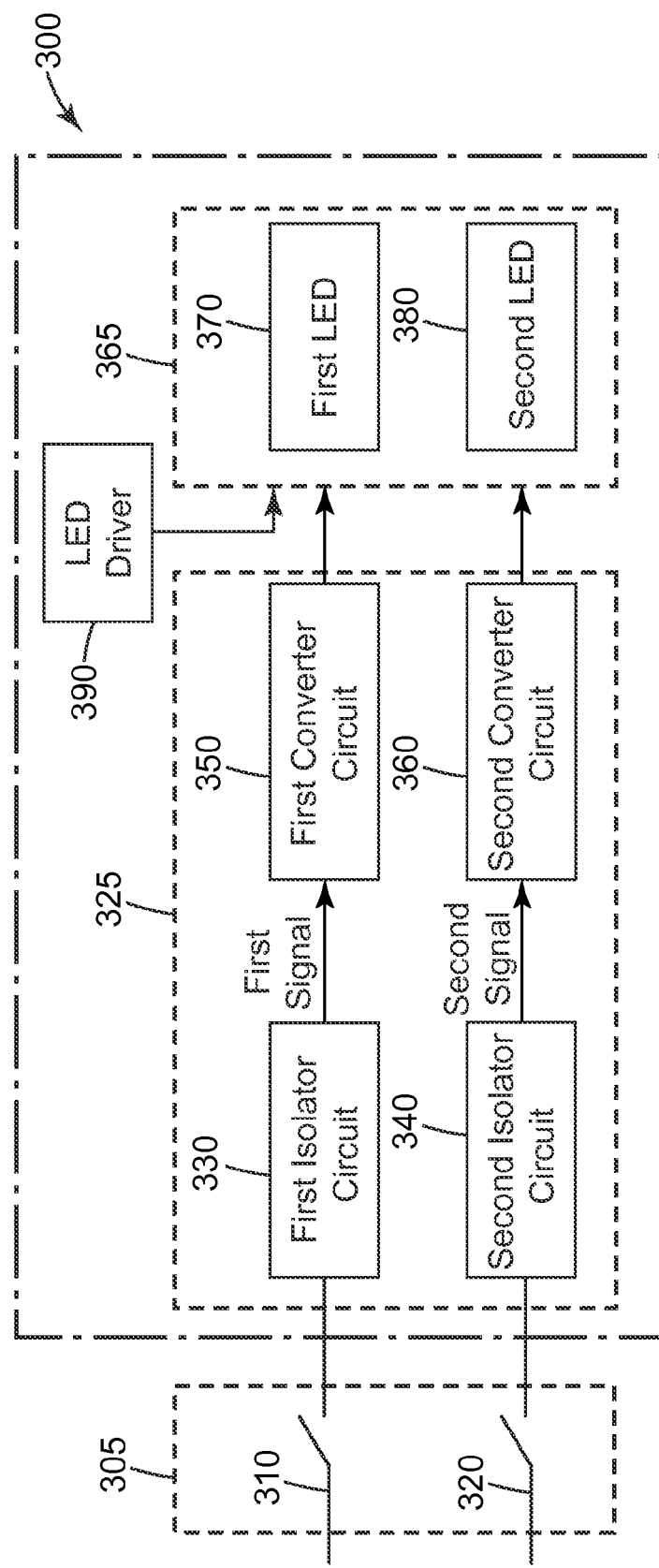
FIG. 3 illustrates a block diagram of an exemplary embodiment of an LED lighting assembly electrically coupled to a multilevel light switch.

FIG. 3 illustrates a block diagram of an exemplary embodiment of an LED lighting assembly 300 electrically coupled to a multilevel light switch 305. In some cases, the multilevel light switch 305 can include a first switch 310 and a second switch 320. In some embodiments, the LED lighting assembly 300 includes an LED switch circuit 325, an LED driver 390, and LED devices 365. In some embodiments, the LED switch circuit 325 includes a first isolator circuit 330, a second isolator circuit 340, a first converter circuit 350, and a second converter circuit 360. The LED devices 365 include a first LED 370 and a second LED 380. In some embodiments, the LED switch circuit 325 can regulate the output of the LED driver 390 to determine which LED(s) are supplied with current.

In some cases, the first isolator circuit 330 and/or the second isolator circuit 340 can include a circuit designed to provide electrical isolation between input and output so that the state of the circuit switches can be detected independently. For example, the state of the first switch 310 will have minimum or no impact on the output signal from the second isolator circuit 340. The isolator circuit can include IC chips, circuits including analog and/or digital components and/or sensing components, or a combination thereof. For example, the isolator circuit can include opto-isolator(s), inductive transformer(s), digital isolator(s), or the like. In an exemplary embodiment, the first isolator circuit 330 and/or the second isolator circuit 340 can include one or more opto-isolators, also referred to as optocouplers, which can convert an electrical input signal into light, detect the converted light, and then modulate current flowing from a power source. In some cases, the first isolator circuit 330 and/or the second isolator circuit 340 can include a bridge circuit designed to prevent current back flow from one isolator circuit to the other isolator circuit.

In some embodiments, the first isolator circuit 330 can detect the state of the first switch 310 and generate a first signal corresponding to the first switch state. The second isolator circuit 340 can detect the state of the second switch 320 and generate a second signal corresponding to the second switch state. In some cases, the first converter circuit 350 is coupled to the first LED 370 and configured to receive the first signal generated by the first isolator circuit 330. The second converter circuit 360 is coupled to the second LED 380 and configured to receive the second signal generated by the second isolator circuit 340. The first converter circuit 350 is further configured to change the current flowing through the first LED 370 in response to the first signal, where the current is supplied by the LED driver 390. The second converter circuit 360 is further configured to change the current flowing through the second LED 380 in response to the second signal, where the current is supplied by the LED driver 390.

In some embodiments, the first converter circuit 350 and/or the second converter circuit 360 can include a transistor to regulate current. In some implementations, the first converter circuit 350 and/or the second converter circuit 360 can include an enhancement FET. In some embodiments, the first LED 370 has a first color and the second LED 380 has a second color. The first color is different from the second color of the second LED. In such implementations, the LED lighting assembly 300 can produce different spectral mixing. In some embodiments, the LED lighting assembly 300 can optionally include an optical mixing cavity, which contains the LED devices 365. In some cases, the optical mixing cavity can be implemented with various optical components to provide intra-cavity optical mixing and then produce substantially uniform illumination output. The optical components can include one or more of, for example, such as diffusers, reflectors, transflectors, polarizing films, brightness enhancement films (BEF), or the like.

Figure 4:
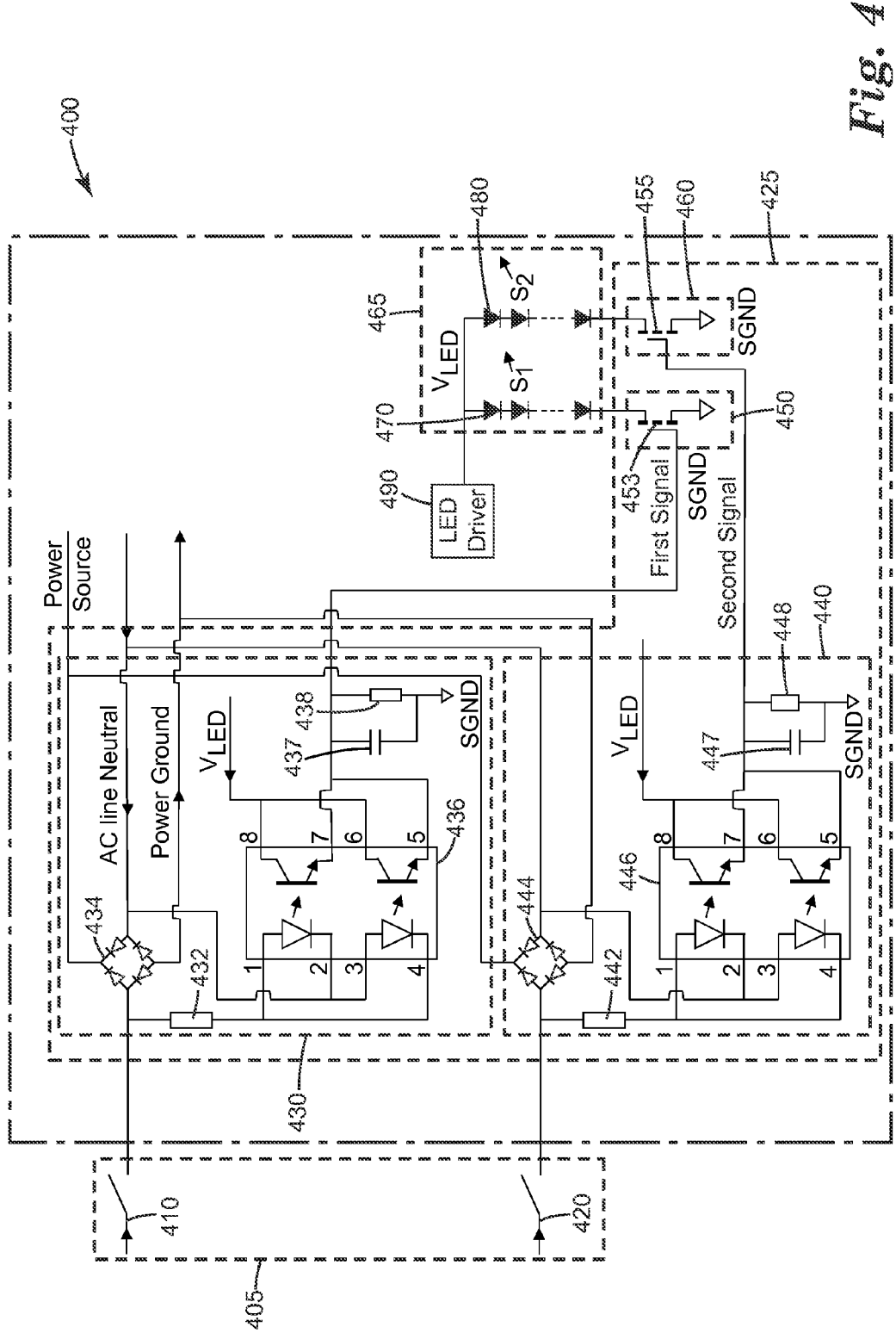
FIG. 4 illustrates a schematic diagram of an exemplary embodiment of an LED lighting assembly electrically coupled to a multilevel light switch.

FIG. 4 illustrates a schematic diagram of an exemplary embodiment of an LED lighting assembly 400 electrically coupled to a multilevel light switch 405. In some embodiments, the LED lighting assembly 400 includes an LED switch circuit 425 coupled to the multilevel light switch 405, an LED driver 490, and an LED device 465. The LED device 465 includes a first LED string 470 and a second LED string 480. An LED string refers to one or more LED(s) connected in series. The LED switch circuit 425 includes a first isolator circuit 430, a second isolator circuit 440, a first converter circuit 450, and a second converter circuit 460. The multilevel light switch 405 includes a first switch 410 and a second switch 420. In some implementations, the multilevel light switch 405 is a three-way socket switch where the first switch 410 is connected to the AC line hot ring contact and the second switch 420 is connected to the AC line hot center contact. The first isolator circuit 430 is electrically coupled to the first switch 410. The second isolator circuit 440 is electrically coupled to the second switch 420.

In some embodiments as illustrated in FIG. 4, the first isolator circuit 430 includes a resistor 432, an opto-isolator device 436, a rectifier 434, a capacitor 437, and a resistor 438. In some implementations, the opto-isolator device 436 can include two optocouplers where each opto-coupler is designed to accept current of one polarity. For example, the opto-isolator device 436 is TLP523-2, available from Toshiba Corporation, Tokyo, Japan. The resistor 432 is connected between the first switch 410 and the input pins (i.e., pin 1 and pin 4) of the opto-isolator device 436, where the other two input pins of the opto-isolator device are connected to AC line neutral. The rectifier 434 can include a diode bridge circuit (as illustrated) or other rectifier circuit. The rectifier circuit can facilitate independent detection of the states of the two switches 410 and 420. In some implementations, for example, when the first switch 410 is on and the second switch 420 is off, the rectifier 444 can prevent the current "leaking" from the first isolator circuit 430 into the second isolator circuit 440. In some cases, the rectifier 434 also provides rectified power to the LED driver 490. The capacitor 437 and the resistor 438 are connected to output pins (i.e., pin 5 and pin 7) of the opto-isolator device 436. The first isolator circuit 430 generates a first signal at the output pins (i.e., pin 5 and pin 7) of the opto-isolator device 436 that feeds into the first converter circuit 450.

Similarly, in some embodiments, the second isolator circuit 440 includes a resistor 442, an opto-isolator device 446, a rectifier 444, a capacitor 447, and a resistor 448, with a similar circuit design as the first isolator circuit 430. The second isolator circuit 440 generates a second signal at the output pins (i.e., pin 5 and pin 7) of the opto-isolator device 446 that feeds into the second converter circuit 460.

In some embodiments, the first converter circuit 450 and/or the second converter circuit 460 can include one or more transistors, where each transistor is in series with an LED string to turn the LED string on or off. In some implementations as illustrated in FIG. 4, the first converter circuit 450 can include a field-effect transistor (FET) 453 and the second converter circuit 460 can include a FET 455. In some cases, the FET 453 and/or FET 455 has a very low drain-source channel resistance $R_{ds(on)}$ (i.e., below 1Ω) to reduce resistive loss.

In some embodiments, the first converter circuit 450 is configured to allow current to flow through the first LED string 470 when the first switch state of the first switch 410 is on; the first converter circuit 450 is configured to prevent current from flowing through the first LED string 470 when the first switch state of the first switch 410 is off. Similarly, in some embodiments, the second converter circuit 460 is configured to allow current to flow through the second LED string 480 when the second switch state of the second switch 420 is on; the second converter circuit 460 is configured to prevent current from flowing through the second LED string 480 when the second switch state of the second switch 420 is off.

In some embodiments, the first LED string 470 includes one or more LEDs having a first color connected in series and the second LED string 480 includes one or more LEDs having a second color connected in series. The first color is different from the second color. In such embodiments, the LED lighting assembly 400 can produce different colors of illumination with various switch states of the multilevel light switch 405. For example, if the first LED string 470 has blue color LEDs and the second LED string 480 has red color LEDs, the LED lighting assembly 400 produces blue light when the first switch 410 is on and the second switch 420 is off, red light when the first switch 410 is off and the second switch 420 is on, and purple or magenta light when both the first switch 410 and the second switch 420 are on.

Figure 5:
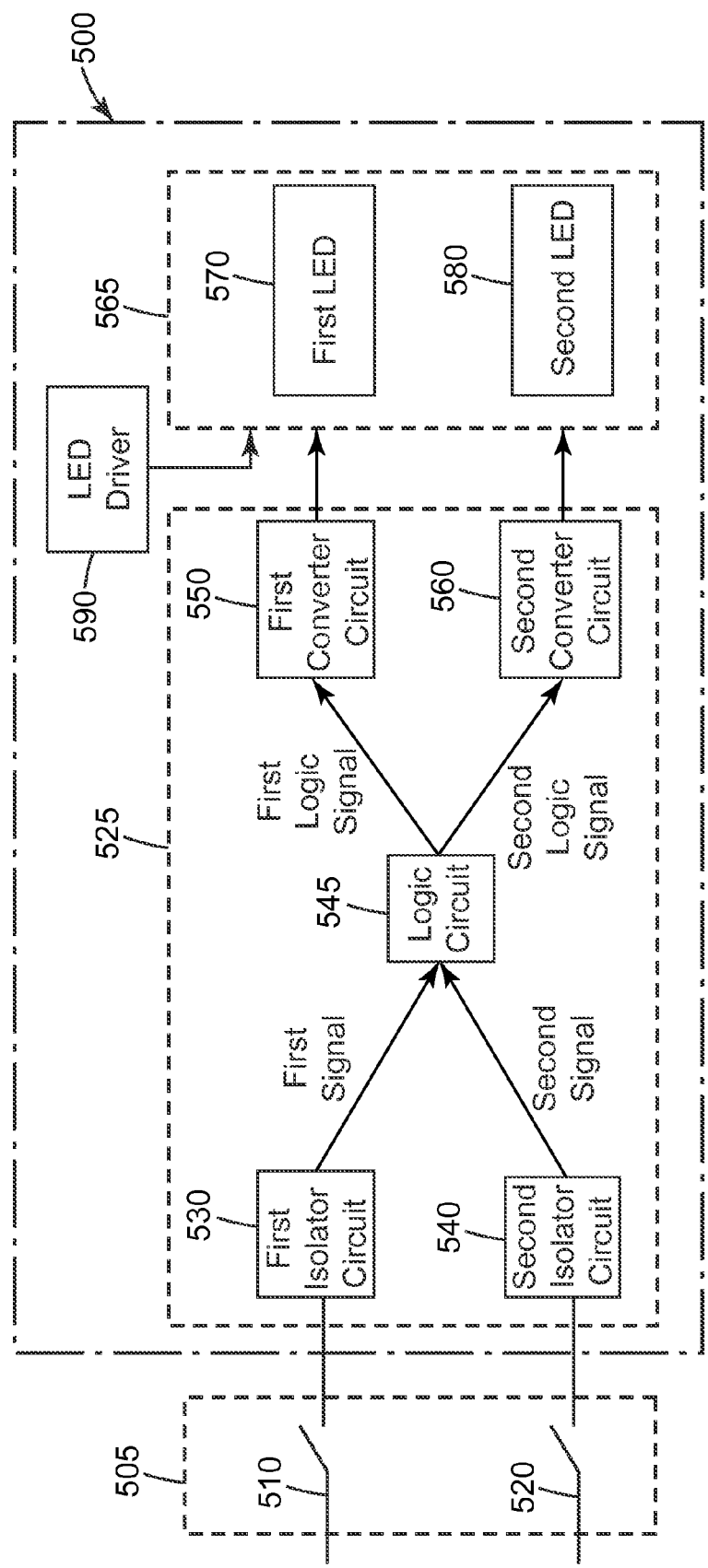
FIG. 5 illustrates a block diagram of another embodiment of an LED lighting assembly electrically coupled to a multilevel light switch.

FIG. 5 illustrates a block diagram of another embodiment of an LED lighting assembly 500 electrically coupled to a multilevel light switch 505. In some cases, the multilevel light switch 505 can include a first switch 510 and a second switch 520. In some embodiments, the LED lighting assembly 500 includes an LED switch circuit 525, an LED driver 590, and LED devices 565. In some embodiments, the LED switch circuit 525 includes a first isolator circuit 530, a second isolator circuit 540, a logic circuit 545, a first converter circuit 550, and a second converter circuit 560. The multilevel light switch 505 includes a first switch 510 and a second switch 520. The LED devices 565 include a first LED 570 and a second LED 580. In some cases, the first LED 570 and/or the second LED 580 can be a string of LEDs connected in series. In some embodiments, the LED switch circuit 525 can regulate the output of the LED driver 590 by determining which LED(s) are supplied with current.

In some cases, the first isolator circuit 530 and/or the second isolator circuit 540 can include a circuit designed to provide electrical isolation between input and output so that the state of the circuit switches can be detected independently. For example, the state of the first switch 510 will have minimum or no impact on the output signal from the second isolator circuit 540. The isolator circuit can include IC chips, circuits including analog and/or digital components and/or sensing components, or a combination thereof. For example, the isolator circuit can include opto-isolator(s), inductive transformer(s), digital isolator(s), or the like. In an exemplary embodiment, the first isolator circuit 530 and/or the second isolator circuit 540 can include one or more opto-isolators, also referred to as optocouplers, which can convert an electrical input signal into light, detect the converted light, and then modulate current flowing from a power source. In some cases, the first isolator circuit 530 and/or the second isolator circuit 540 can include a bridge circuit designed to prevent current back flow from one isolator circuit to the other isolator circuit.

In some embodiments, the first isolator circuit 530 can detect the state of the first switch 510 and generate a first signal corresponding to the first switch state. The second isolator circuit 540 can detect the state of the second switch 520 and generate a second signal corresponding to the second switch state. The logic circuit 545 is coupled to the first isolator circuit 530 and the second isolator circuit 540 and configured to receive the first signal and the second signal. The logic circuit generates a first logic signal and a second logic signal based on the first signal and the second signal. In some cases, the first converter circuit 550 is coupled to the first LED 570 and configured to receive the first logic signal generated by the logic circuit 545. The second converter circuit 560 is coupled to the second LED 580 and configured to receive the second logic signal generated by the logic circuit 545. The first converter circuit 550 is further configured to change the current flowing through the first LED 570 in response to the first logic signal, where the current is supplied by the LED driver 590. The second converter circuit 560 is further configured to change the current flowing through the second LED 580 in response to the second logic signal, where the current is supplied by the LED driver 590.

In some embodiments, the first converter circuit 550 and/or the second converter circuit 560 can include a transistor to regulate current. In some implementations, the first converter circuit 550 and/or the second converter circuit 560 can include an enhancement FET. In some implementations, the first LED 570 has a first color and the second LED 580 has a second color. The first color is different from a second color of the second LED. In such implementations, the LED lighting assembly 500 can produce different spectral mixing. In some embodiments, the LED lighting assembly 500 can optionally include an optical mixing cavity, which contains the LED devices 565. In some cases, the optical mixing cavity can be implemented with various optical components to provide intra-cavity optical mixing and then produce substantially uniform illumination output. The optical components can include one or more of, for example, such as diffusers, reflectors, transflectors, polarizing films, brightness enhancement films (BEF), or the like.

Figure 6:
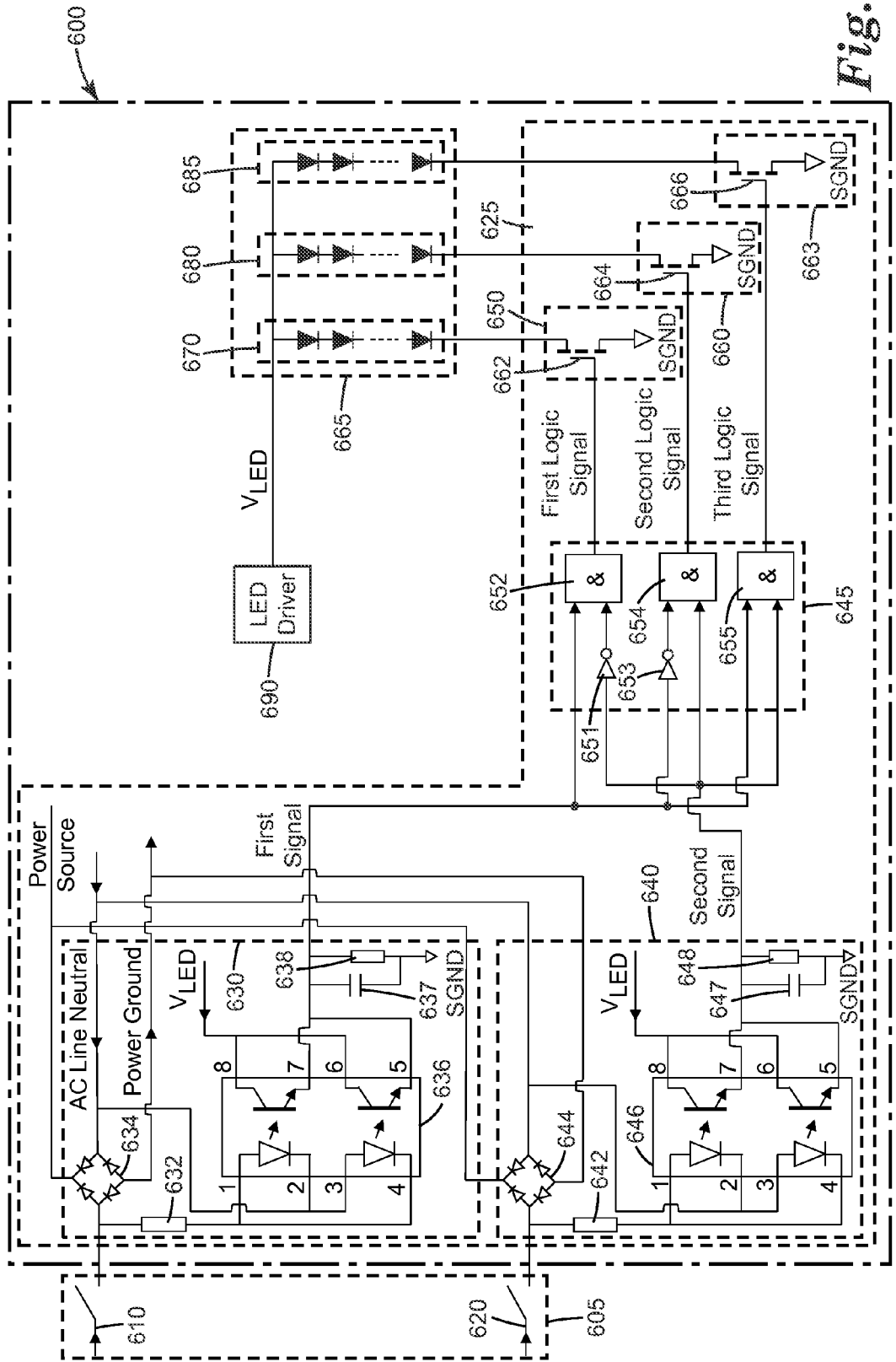
FIG. 6 illustrates a schematic diagram of an exemplary embodiment of an LED lighting assembly electrically coupled to a multilevel light switch.

FIG. 6 illustrates a schematic diagram of an exemplary embodiment of an LED lighting assembly 600 electrically coupled to a multilevel light switch 605. In some embodiments, the LED lighting assembly 600 includes an LED switch circuit 625 coupled to the multilevel light switch 605, an LED driver 690, and an LED device 665. The LED device 665 includes a first LED string 670, a second LED string 680, and a third LED string 685. The LED switch circuit 625 includes a first isolator circuit 630, a second isolator circuit 640, a logic circuit 645, a first converter circuit 650, a second converter circuit 660, and a third converter circuit 663. The multilevel light switch 605 includes a first switch 610 and a second switch 620. In some implementations, the multilevel light switch 605 is a three-way socket switch where the first switch 610 is connected to the AC line hot ring contact and the second switch 620 is connected to the AC line hot center contact. The first isolator circuit 630 is electrically coupled to the first switch 610. The second isolator circuit 640 is electrically coupled to the second switch 620.

In some embodiments as illustrated in FIG. 6, the first isolator circuit 630 includes a resistor 632, an opto-isolator device 636, a rectifier 634, a capacitor 637, and a resistor 638. In some implementations, the opto-isolator device 636 can include two optocouplers where each opto-coupler is designed to accept current of one polarity. For example, the opto-isolator device 636 is a TLP523-2, available from Toshiba Corporation, Tokyo, Japan. The resistor 632 is connected between the first switch 610 and the input pins (i.e., pin 1 and pin 4) of the opto-isolator device 636, where the other two input pins of the opto-isolator device are connected to AC line neutral. The rectifier 634 can include a diode bridge (as illustrated) or other rectifier circuit. The rectifier circuit can be used to allow independent detection of the states of the two switches 610 and 620. In some implementations, for example, when the first switch 610 is on and the second switch 620 is off, the rectifier 644 can prevent the current "leaking" from the first isolator circuit 630 into the second isolator circuit 640. In some cases, the rectifier 634 also provides rectified power to the LED driver 690. The capacitor 637 and the resistor 638 are connected to output pins (i.e., pin 5 and pin 7) of the opto-isolator device 636. The first isolator circuit 630 generates a first signal at the output pins (i.e., pin 5 and pin 7) of the opto-isolator device 636 that feeds into the logic circuit 645.

Similarly, in some embodiments, the second isolator circuit 640 includes a resistor 642, an opto-isolator device 646, a rectifier 644, a capacitor 647, and a resistor 648, with a similar circuit design as the first isolator circuit 630. The second isolator circuit 640 generates a second signal at the output pins (i.e., pin 5 and pin 7) of the opto-isolator device 646 that feeds into the logic circuit 645. The logic circuit 645 can include any type of logic components, including but not limited to, AND logic gates, OR logic gates, inverter gates, or the like. In some cases, the logic circuit 645 can be implemented by chips, transistors, diodes, or other electronic components. In some other cases, the logic circuit 645 can be implemented by firmware using a microprocessor or microcontroller. In an exemplary implementation of the logic circuit 645, as illustrated in FIG. 6, the logic circuit 645 includes three AND gates 652, 654, and 655, and two inverter gates 651 and 653. The logic circuit 645 generates three distinct logic signals based on the first signal and the second signal, as illustrated in Table 2. Other logic circuits can also be implemented using the first signal and the second signal as input and generate other logic signals.

TABLE 2

| First Signal | Second Signal | First Logic Signal | Second Logic Signal | Third Logic Signal |
|---|---|---|---|---|
| 0 | 0 | 0 | 0 | 0 |
| 1 | 0 | 1 | 0 | 0 |
| 0 | 1 | 0 | 1 | 0 |
| 1 | 1 | 0 | 0 | 1 |

In some embodiments, the first converter circuit 650 and/or the second converter circuit 660 and/or the third converter circuit 663 can include one or more transistors, where each transistor is in series with an LED string to turn the LED string on or off. In some implementations as illustrated in FIG. 6, the first converter circuit 650 can include a field-effect transistor (FET) 662, the second converter circuit 660 can include a FET 664, and the third converter circuit 663 can include a FET 666. In some cases, the FETs 662, 664, 666 may have a very low drain-source channel resistance $R_{ds(on)}$ (i.e., below 1Ω) to reduce resistive loss.

In some embodiments, with the logic implemented in Table 2, the first converter circuit 650 is configured to allow current to flow through the first LED string 670 when the first logic signal is 1; the first converter circuit 650 is configured to prevent current from flowing through the first LED string 670 when the first logic signal is 0. Similarly, in some embodiments, the second converter circuit 660 is configured to allow current to flow through the second LED string 680 when the second logic signal is 1; the second converter circuit 660 is configured to prevent current from flowing through the second LED string 680 when the second logic signal is 0. Similarly, in some embodiments, the third converter circuit 663 is configured to allow current to flow through the third LED string 685 when the third logic signal is 1; the third converter circuit 663 is configured to prevent current from flowing through the third LED string 685 when the third logic signal is 0.

In some embodiments, the first LED string 670 includes one or more LEDs having a first color connected in series, the second LED string 680 includes one or more LEDs having a second color connected in series, and the third LED string 685 includes one or more LEDs having a third color connected in series. The first color, the second color, and the third color can be different. In such embodiments, the LED lighting assembly 600 can produce different colors of illumination with various switch states of the multilevel light switch 605. For example, with implemented logic as in Table 2, if the first LED string 670 has blue color LEDs, the second LED string 680 has red color LEDs, and the third LED string 685 has yellow color LEDs, the LED lighting assembly 600 produces blue light when the first logic signal is 1 and the other logic signals are 0, red light when the second logic signal is 1 and the other logic signals are 0, and yellow light when the third logic signal is 1 and the other logic signals are 0.

13

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims.

EXEMPLARY EMBODIMENTS

Embodiment One

An LED switch circuit designed to connect to an LED driver and a multilevel light switch having a first switch and a second switch, comprising:
a first isolator circuit coupled to the first switch, the first isolator circuit configured to detect a first switch state of the first switch and produce a first signal associated with the first switch state,
a second isolator circuit coupled to the second switch, the second isolator circuit configured to detect a second switch state of the second switch and produce a second signal associated with the second switch state,
a converter circuit coupled to a dimming input port of the LED driver, the converter circuit configured to receive the first signal and the second signal and generate a dimming signal associated with the first signal and the second signal,
wherein the dimming input port of the LED driver receives the dimming signal from the converter circuit and the LED driver is configured to control an LED based upon the dimming signal.

Embodiment Two

The LED switch circuit of Embodiment One, wherein at least one of the first isolator circuit and the second isolator circuit comprises an opto-isolator or a digital isolator.

Embodiment Three

The LED switch circuit of Embodiment One or Embodiment Two, wherein at least one of the first isolator circuit and the second isolator circuit comprises a rectifier.

Embodiment Four

The LED switch circuit of any one of the Embodiment One through Embodiment Three, wherein the LED driver controls current flowing through an LED coupled to the LED driver in response to the dimming signal from the converter circuit.

Embodiment Five

The LED switch circuit of any one of the Embodiment One through Embodiment Four, wherein the converter circuit comprises a transistor.

Embodiment Six

The LED switch circuit of any one of the Embodiment One through Embodiment Five, wherein the second isolator circuit comprises an opto-isolator.

Embodiment Seven

The LED switch circuit of any one of the Embodiment One through Embodiment Six, wherein the dimming signal has four amplitude levels corresponding to the four combined states of the first switch state and the second switch state, and wherein the LED driver is configured to generate four current levels to supply to an LED in response to the dimming signal.

Embodiment Eight

The LED switch circuit of Embodiment Seven, wherein the dimming signal is at a first amplitude level when the first switch state is off and the second switch state is off, and
wherein the LED driver is configured in response to the dimming signal to supply a first level current to an LED.

Embodiment Nine

The LED switch circuit of Embodiment Seven, wherein the dimming signal is at a second amplitude level when the first switch state is off and the second switch state is on, and
wherein the LED driver is configured in response to the dimming signal to supply a second level current to an LED.

Embodiment Ten

The LED switch circuit of Embodiment Seven, wherein the dimming signal is at a third amplitude level when the first switch state is on and the second switch state is off, and
wherein the LED driver is configured in response to the dimming signal to supply a third level current to an LED.

Embodiment Eleven

The LED switch circuit of Embodiment Seven, wherein the dimming signal is at a fourth amplitude level when the first switch state is on and the second switch state is on, and
wherein the LED driver is configured in response to the dimming signal to supply a fourth level current to an LED.

Embodiment Twelve

An LED lighting assembly designed to connect to a multi-level light switch having a first switch and a second switch, comprising:
a first LED,
a second LED, and
an LED switch circuit, comprising:
a first isolator circuit coupled to the first switch, the first isolator circuit configured to detect a first switch state and produce a first signal associated with the first switch state,
a second isolator circuit coupled to the second switch, the second isolator circuit configured to detect a second switch state and produce a second signal associated with the second switch state,
a first converter circuit coupled to the first LED, the first converter circuit configured to receive the first signal and change current flowing through the first LED in response to the first signal, and
a second converter circuit coupled to the second LED, the second converter circuit configured to receive the second signal and change current flowing through the second LED in response to the second signal.

Embodiment Thirteen

The LED lighting assembly of Embodiment Twelve, wherein the first LED has a first color different from a second color of the second LED.

Embodiment Fourteen

The LED lighting assembly of Embodiment Twelve or Embodiment Thirteen, wherein at least one of the first isolator circuit and the second isolator circuit comprises an opto-isolator or digital isolator.

Embodiment Fifteen

The LED lighting assembly of any one of the Embodiment Twelve through Embodiment Fourteen, wherein the first converter circuit comprises a transistor.

Embodiment Sixteen

The LED lighting assembly of any one of the Embodiment Twelve through Embodiment Fifteen, wherein the first converter circuit is configured to allow current to flow through the first LED when the first switch state is on.

Embodiment Seventeen

The LED lighting assembly of any one of the Embodiment Twelve through Embodiment Sixteen, wherein the first converter circuit is configured to prevent current from flowing through the first LED when the first switch state is off.

Embodiment Eighteen

The LED lighting assembly of any one of the Embodiment Twelve through Embodiment Seventeen, wherein the second converter circuit is configured to allow current to flow through the second LED when the second switch state is on.

Embodiment Nineteen

The LED lighting assembly of any one of the Embodiment Twelve through Embodiment Eighteen, wherein the second converter circuit is configured to prevent current from flowing through the second LED when the second switch state is off.

Embodiment Twenty

An LED lighting assembly designed to connect to a multilevel light switch having a first switch and a second switch, comprising:
  a first LED,
  a second LED, and
  an LED switch circuit, comprising:
    a first isolator circuit coupled to the first switch, the first isolator circuit configured to detect a first switch state and produce a first signal associated with the first switch state,
    a second isolator circuit coupled to the second switch, the second isolator circuit configured to detect a second switch state and produce a second signal associated with the second switch state,
    a logic circuit coupled to the first isolator circuit and the second isolator circuit, the logic circuit configured to receive the first signal and the second signal and generate a first logic signal and a second logic signal based on the first signal and the second signal,
    a first converter circuit coupled to the logic circuit and the first LED, the first converter circuit configured to receive the first logic signal and change current flowing through the first LED in response to the first logic signal, and
    a second converter circuit coupled to the logic circuit and the second LED, the second converter circuit configured to receive the second logic signal and change current flowing through the second LED in response to the second logic signal.

Embodiment Twenty-one

The LED lighting assembly of Embodiment Twenty, wherein the first LED has a first color different from a second color of the second LED.

Embodiment Twenty-two

The LED lighting assembly of Embodiment Twenty or Embodiment Twenty-one, wherein at least one of the first isolator circuit and the second isolator circuit comprises an opto-isolator or a digital isolator.

Embodiment Twenty-three

The LED lighting assembly of any one of the Embodiment Twenty through Embodiment Twenty-two, further comprising:
  a third LED,
  a third converter circuit coupled to the logic circuit and the third LED,
  wherein the logic circuit generate a third logic signal based on the first signal and the second signal, the third converter circuit is configured to receive the first logic signal and change current flowing through the third LED in response to the third logic signal.

What is claimed is:
1. An LED switch circuit designed to connect to a first LED and a second LED and a multilevel light switch having a first switch and a second switch, comprising:
  a first isolator circuit coupled to the first switch, the first isolator circuit configured to detect a first switch state of the first switch and produce a first signal associated with the first switch state,
  a second isolator circuit coupled to the second switch, the second isolator circuit configured to detect a second switch state of the second switch and produce a second signal associated with the second switch state,
  a first converter circuit coupled to the first LED, the first converter circuit configured to receive the first signal and change current flowing through the first LED in response to the first signal,
  a second converter circuit coupled to the second LED, the second converter circuit configured to receive the second signal and change current flowing through the second LED in response to the second signal.
2. The LED switch circuit of claim 1, wherein at least one of the first isolator circuit and the second isolator circuit comprises an opto-isolator or a digital isolator.

3. The LED switch circuit of claim 1, wherein at least one of the first isolator circuit and the second isolator circuit comprises a rectifier.

4. The LED switch circuit of claim 1, wherein the first converter circuit comprises a transistor.

5. The LED switch circuit of claim 1, further comprising: a logic circuit coupled to the first isolator circuit and the second isolator circuit, the logic circuit configured to receive the first signal and the second signal and generate a first logic signal and a second logic signal based on the first signal and the second signal.

6. An LED lighting assembly designed to connect to a multilevel light switch having a first switch and a second switch, comprising:
   a first LED,
   a second LED, and
   an LED switch circuit, comprising:
      a first isolator circuit coupled to the first switch, the first isolator circuit configured to detect a first switch state and produce a first signal associated with the first switch state,
      a second isolator circuit coupled to the second switch, the second isolator circuit configured to detect a second switch state and produce a second signal associated with the second switch state,
      a first converter circuit coupled to the first LED, the first converter circuit configured to receive the first signal and change current flowing through the first LED in response to the first signal, and
      a second converter circuit coupled to the second LED, the second converter circuit configured to receive the second signal and change current flowing through the second LED in response to the second signal.

7. The LED lighting assembly of claim 6, wherein the first LED has a first color different from a second color of the second LED.

8. The LED lighting assembly of claim 6, wherein at least one of the first isolator circuit and the second isolator circuit comprises an opto-isolator or a digital isolator.

9. The LED lighting assembly of claim 6, wherein the first converter circuit comprises a transistor.

10. An LED lighting assembly designed to connect to a multilevel light switch having a first switch and a second switch, comprising:
    a first LED,
    a second LED, and
    an LED switch circuit, comprising:
       a first isolator circuit coupled to the first switch, the first isolator circuit configured to detect a first switch state and produce a first signal associated with the first switch state,
       a second isolator circuit coupled to the second switch, the second isolator circuit configured to detect a second switch state and produce a second signal associated with the second switch state,
       a logic circuit coupled to the first isolator circuit and the second isolator circuit, the logic circuit configured to receive the first signal and the second signal and generate a first logic signal and a second logic signal based on the first signal and the second signal,
       a first converter circuit coupled to the logic circuit and the first LED, the first converter circuit configured to receive the first logic signal and change current flowing through the first LED in response to the first logic signal, and
       a second converter circuit coupled to the logic circuit and the second LED, the second converter circuit configured to receive the second logic signal and change current flowing through the second LED in response to the second logic signal.

11. The LED lighting assembly of claim 10, wherein the first LED has a first color different from a second color of the second LED.

12. The LED lighting assembly of claim 10, wherein at least one of the first isolator circuit and the second isolator circuit comprises an opto-isolator or a digital isolator.

13. The LED lighting assembly of claim 10, further comprising:
    a third LED,
    a third converter circuit coupled to the logic circuit and the third LED,
    wherein the logic circuit generate a third logic signal based on the first signal and the second signal, the third converter circuit is configured to receive the first logic signal and change current flowing through the third LED in response to the third logic signal.

* * * * *